US006732067B1

(12) United States Patent
Powderly (10) Patent No.: US 6,732,067 B1
(45) Date of Patent: May 4, 2004

(54) SYSTEM AND ADAPTER CARD FOR REMOTE CONSOLE EMULATION

(75) Inventor: Terrence V. Powderly, East FallowField, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/310,542

(22) Filed: May 12, 1999

(51) Int. Cl.⁷ .............................................. G06F 9/455
(52) U.S. Cl. ...................................... 703/24; 345/740
(58) Field of Search .............................. 703/23, 24, 25; 345/740, 532, 719; 375/222; 710/260

(56) References Cited

U.S. PATENT DOCUMENTS

| | | | |
|---|---|---|---|
| 5,136,695 A | | 8/1992 | Goldshlag et al. ........... 395/275 |
| 5,402,431 A | * | 3/1995 | Saadeh et al. ............... 714/431 |
| 5,410,706 A | | 4/1995 | Farrand et al. .............. 395/700 |
| 5,440,699 A | * | 8/1995 | Farrand et al. .............. 345/740 |
| 5,444,849 A | * | 8/1995 | Farrand et al. .............. 709/237 |
| 5,590,315 A | | 12/1996 | Hess et al. ................... 395/500 |
| 5,604,509 A | | 2/1997 | Moore et al. ................... 345/2 |
| 5,712,978 A | | 1/1998 | Lerner et al. ........... 395/200.11 |
| 5,721,842 A | | 2/1998 | Beasley et al. .............. 395/311 |
| 5,732,212 A | | 3/1998 | Perholtz et al. ........ 395/200.11 |
| 5,764,974 A | | 6/1998 | Walster et al. .............. 395/606 |
| 5,794,239 A | | 8/1998 | Walster et al. ................. 707/6 |
| 5,825,336 A | | 10/1998 | Fujita et al. .................... 345/2 |
| 6,044,062 A | * | 3/2000 | Brownrigg et al. ......... 370/238 |
| 6,052,744 A | * | 4/2000 | Moriarty et al. ............... 710/27 |
| 6,085,329 A | * | 7/2000 | Klein | |
| 6,128,669 A | * | 10/2000 | Moriarty et al. ................ 710/1 |
| 6,166,729 A | * | 12/2000 | Acosta et al. ................ 345/719 |
| 6,272,627 B1 | * | 8/2001 | Mann ............................ 713/2 |
| 6,321,287 B1 | * | 11/2001 | Rao et al. ................... 710/260 |
| 6,326,973 B1 | * | 12/2001 | Behrbaum et al. .......... 345/532 |
| 6,327,264 B1 | * | 12/2001 | Terry et al. .................. 375/222 |

* cited by examiner

*Primary Examiner*—Samuel Broda
*Assistant Examiner*—Kandasamy Thangavelu
(74) *Attorney, Agent, or Firm*—Michael B. Atlass; Mark T. Starr; Rocco L. Adornato (57) ABSTRACT

A system for providing, via a network, emulation of a console of a first computer system on a second, remotely located computer system on the network comprises an adapter card installed in the first computer system and a client program executing on the remotely located computer system. The adapter card comprises a local bus that interfaces to an input/output bus of the first computer system when the adapter card is connected to the first computer system, a graphics controller coupled to the local bus that interacts with the first computer system to generate a representation of a console screen of the first computer system, a network interface controller coupled to the local bus that provides a connection to the network, and a processor coupled to the local bus that determines changes in the representation of the console screen of the first computer system and that transmits information about the changes to the remotely located computer system via the network interface controller.

31 Claims, 4 Drawing Sheets

SYSTEM AND ADAPTER CARD FOR REMOTE CONSOLE EMULATION

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Invention

The present invention is directed to computer systems, and more particularly, to a system for remote emulation of a computer system console.

2. Description of the Prior Art

Large computer systems, including mainframes and enterprise servers, have traditionally included a primary console to enable system administrators to configure and administer the computer system. These primary consoles typically take the form of a monitor, keyboard, and often a pointing device, such as a mouse, attached locally to the computer system. In some cases, the primary console comprise a small workstation that is tightly coupled to the larger computer system.

In order to provide additional flexibility and ease of administration of a large computer system, remote consoles have been provided that emulate the primary console of the computer system on a remote workstation over a modem or network connection. Typically, video information representing the screen of the primary console is captured and transmitted over the network to the remote workstation, which uses the information to reproduce the screen of the primary console on the remote workstation. Keystroke and mouse input at the remote workstation is transmitted to the host computer system and inserted into the system keyboard controller. A system administrator is thus able to administer and configure the computer system from the remote location as if using the primary console of the computer system.

Unfortunately, prior art remote console emulators suffer from a number of drawbacks. Prior art remote console emulators typically must access the host computer system bus to obtain video information to transmit to the remote console. Such an impact on the system bus of the host computer will have an effect on its performance. Prior art remote console emulators also often require special software, such as drivers and the like, running on the host computer. These too can impact the performance of the host computer. Another disadvantage of many prior art remote console emulators is that they do not work equally well in both text and graphics modes, mainly as a result of the software complexities of those solutions. Consequently, there is a need for an improved remote console emulation system that overcomes these noted deficiencies of the prior art. The present invention satisfies this need.

SUMMARY OF THE INVENTION

The present invention is directed to a system, and an adapter card thereof, for providing, via a network, emulation of a console of a first computer system on a second, remotely located computer system on the network. The system comprises the adapter card, which is installed in the first computer system, and a client program executing on the remotely located computer system. According to the present invention, the adapter card comprises a local bus that interfaces to an input/output bus of the first computer system when the adapter card is connected to the first computer system, a graphics controller coupled to the local bus that interacts with the first computer system to generate a representation of a console screen of the first computer system, a network interface controller coupled to the local bus that provides a connection to the network, and a processor coupled to the local bus that determines changes in the representation of the console screen of the first computer system and that transmits information about the changes to the remotely located computer system via the network interface controller. Because the graphics controller, processor, and network interface controller are all co-located on the adapter card, communication among them over the local bus does not impact the performance of the input/output bus of the first computer system. Moreover, the system of the present invention does not require any special software executing on the host computer system.

The client program executes on the remote computer system. It receives the information transmitted from the adapter card and reproduces therefrom the representation of the console screen of the first computer screen on a display device of the remote computer system.

According to another aspect of the present invention, the adapter card further comprises a peripheral device interface coupled to the local bus that can be controlled selectively by either the first computer system or the processor. Selection of either the processor or the first computer system to control the peripheral device interface is achieved by setting/resetting a flag variable stored on the adapter card. When the computer system is started, the processor on the adapter card examines the flag to determine whether it should take control of the peripheral device interface or whether the first computer system should take control. If the processor is to take control, the processor causes a modified BIOS for the peripheral device interface to be loaded by the first computer system that halts the first computer system in order to allow the processor to take control of the peripheral device interface.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

The present invention is directed to a system, including an adapter card, for providing, via a network, emulation (i.e., remote control) of a console of a first computer system, such as a mainframe or enterprise server, on a second, remotely located computer system or workstation on the network. Portions of the present invention may take the form of program code (i.e., instructions) embodied in tangible media, such as floppy diskettes, CD-ROMs, hard drives, or any other computer or machine-readable storage medium, wherein, when the program code is loaded into and executed by a machine, such as a computer, the machine becomes an apparatus for practicing the invention. Portions of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 1:
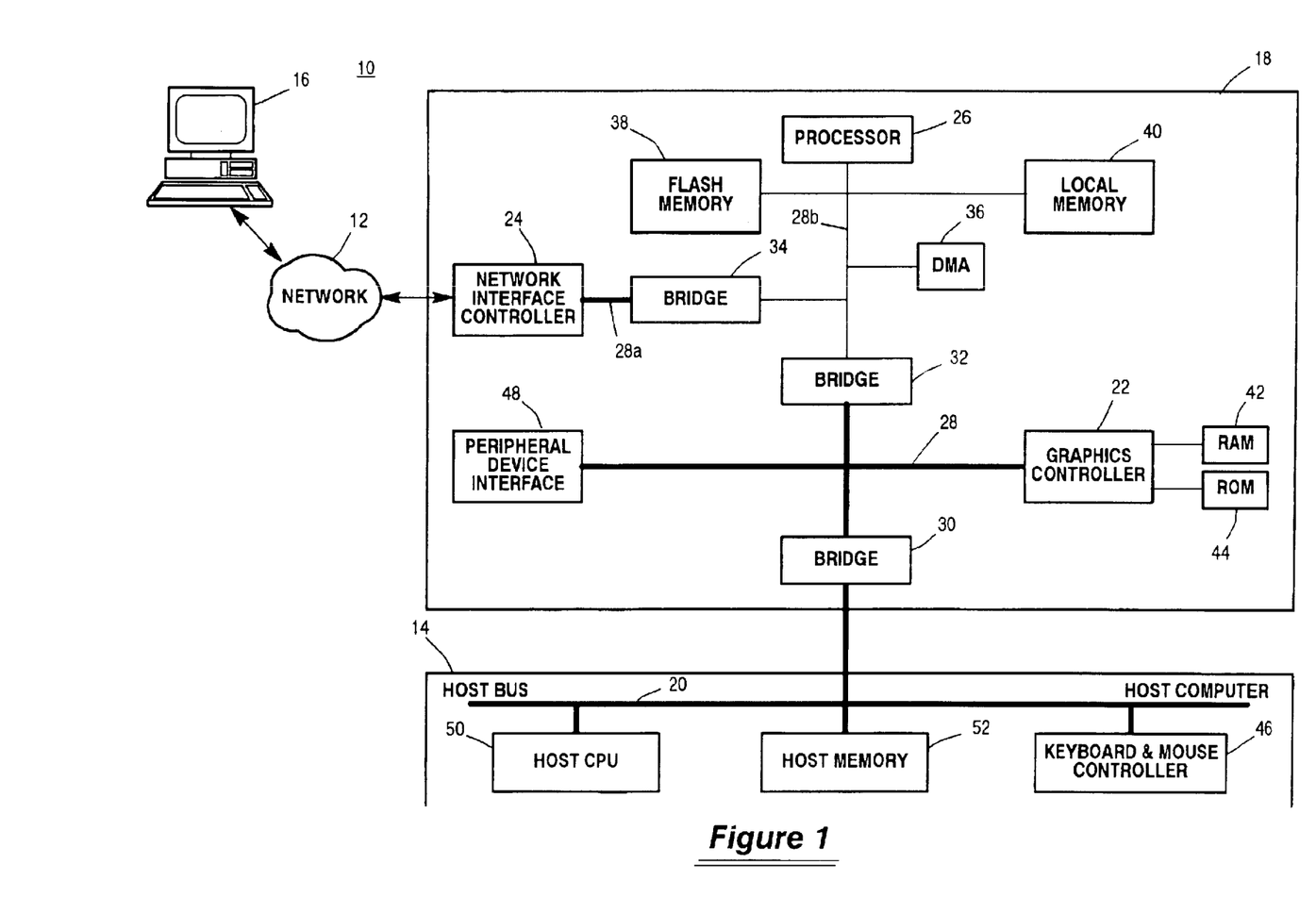
FIG. 1 shows one embodiment of a system of the present invention.

Referring to the drawings, wherein like numerals represent like elements throughout, FIG. 1 shows a system 10 for providing, via a network 12 (including, for example, the Internet), remote control or emulation of a console of a first computer system 14, such as a mainframe or enterprise server, from a second, remotely located computer system or workstation 16 on the network, in accordance with one embodiment of the present invention. The system 10 comprises an adapter card 18 that connects to the input/output (I/O) bus 20 of the computer system 14 and a client program (described hereinafter) executing on the remote workstation 16. In the present embodiment, the adapter card 18 has been designed for use in a computer system 14 in which the I/O bus 20 is a Peripheral Component Interconnect (PCI) bus, specifically one that is compliant with version 2.1 of the PCI specification. However, it is understood that the present invention is by no means limited to use with PCI-based I/O buses, but rather, can be employed in any I/O bus environment, including, for example, other industry-standard bus specifications, such as Industry Standard Architecture (ISA) and Extended ISA (EISA), and proprietary I/O bus implementations.

The adapter card 18 and the client program running on the remote workstation 16 replace the need for the direct attachment of a monitor, mouse and keyboard (i.e., a primary console) to the computer system 14. Instead, they enable the console to be emulated on a remote computer system or workstation anywhere that network connections can be made. In accordance with another feature, as described hereinafter, the adapter card 18 and client program support remote control of disk image loads on the computer system 14, including partitioning, formatting, and loading software and/or data onto, a local storage medium.

The Adapter Card
Remote Console Functionality

According to one embodiment of the adapter card 18 of the present invention, the adapter card 18 comprises a graphics controller 22, a network interface controller 24, and a processor 26, all co-located on the printed circuit board of the adapter card. The graphics controller 22, network interface controller 24, and processor 26 each interface to a local bus 28 on the adapter card. A bridge circuit 30, which in the present embodiment comprises a PCI-to-PCI bridge, provides a bridge between the local bus 28 of the adapter card 18 and the I/O bus 20 of the computer system 14.

In the present embodiment, the processor 26 is indirectly interfaced to the local bus 28 via a second bridge circuit 32.

The network interface controller 24 is indirectly interfaced to the local bus 28 via bridge circuit 30 and a third bridge circuit 34. In this manner, the network interface controller 24 is isolated on a separate local bus segment 28a. Because of this isolation, network traffic will not add load to the main local bus segment 28 over which the graphics controller 22 communicates with the processor 26 and host I/O bus 20. It is understood, however, that in other embodiments, one or both of the network interface controller 24 and processor 26 may be directly connected to the main local bus segment 28. Accordingly, in this regard, the present invention is by no means limited to the implementation shown.

In the present embodiment, the graphics controller 22 supports the Video Graphics Array (VGA) standard. According to the present invention, at least one adapter card 18 functions as the installed graphics controller for the computer system 14; the operating system of the computer system 14 accesses the graphics controller 22 of the adapter card as it would any standard VGA graphics card using standard operating system drivers. In the present embodiment, the graphics controller 22 has an associated video memory 42 that stores information representing the console screen of the computer system 14 and an associated read-only-memory (ROM) 44 in which the VGA BIOS may be stored. Graphics controllers from a variety of manufactures may be used to implement the graphics controller 22. For example, in one embodiment, the graphics controller 22 can be implemented using the CL-GD5465 graphics controller chip manufactured by Cirrus Logic, Inc. Also, while in the present embodiment, the graphics controller 22 supports the VGA standard, in other embodiments, graphics controllers that implement other or future standards may be employed.

In the present embodiment, the network interface controller 24 implements the 10/100BaseT Ethernet protocol, however, in other embodiments, other networking protocols can be employed. In the present embodiment, the network interface controller 24 is implemented using an Intel® 21143 and a QS6611 10/100 Base-TX transceiver available from Quality Semiconductor. The 21143 supports the MAC layer for both 10BaseT and 100BaseT. The QS6611 provides the capability to autodetect the speed of the network and to select 100BaseT where possible. This combination enables the network interface controller 24 to support 10/100BaseT full duplex Ethernet with automatic detection of speed and simplex/duplex operation. The network interface controller 24 employs Transmission Control Protocol/Internet Protocol (TCP/IP) over the Ethernet to communicate with the client program on the remote workstation 16, as described more fully below.

In the present embodiment, the processor 26 has an associated flash memory 38, in which operating system and program code that the processor 26 executes is stored, and an associated local random-access memory 40, both of which interface to the processor 26 via local bus segment 28b. A memory controller 36, such as a Direct Memory Access controller (DMA), may also be interfaced to the bus segment 28b to control memory transfers to and from the local memory 40. In the present embodiment, the processor 26 is implemented using an i960® RP microprocessor available from Intel Corporation, which incorporates the functionality of the processor 26, the bridges 32 and 34, and the DMA controller 36 in a single semiconductor chip package in which the local bus segment 28b is internal to the chip package. Also in the present embodiment, the i960® RP processor operates under the control of the VxWorks® real-time operating system (RTOS) available from Wind River Systems. The operating system code is stored in the flash memory 38. Upon reset of the i960® RP processor, the processor loads and boots the VxWorks operating system. In other embodiments, the particular microprocessor and operating system therefor may be different. Moreover, while the functionality of the bridges 32 and 34 and the DMA controller 36 are included in a single chip package in the i960® RP processor, in other embodiments, these functional units may be implemented using separate, discrete components.

In use, the foregoing components, in combination with program code (described hereinafter) executed by the processor 26, operate to reproduce the console screen of the computer system 14 on a monitor (or other display) of the remote workstation 16 and to pass keystrokes and mouse movement and click information gathered at the remote workstation 16 to the computer system 14. In greater detail, in the present embodiment, the processor 26 determines changes in the representation of the console screen generated by the graphics controller 22, and information about the changes is then packaged, with header information, into TCP/IP segments and transmitted to the client program over the network 12 via the network interface controller 24. The client program interprets the received information and based on that information is able to reproduce the console screen on the monitor of the remote workstation 16, thus effectively mimicking what would have been displayed on a local console screen at the computer system 14. Simultaneously, the client program captures keystroke and mouse movement and click information at the remote workstation, packages the information, with head information, into TCP/EP segments, and transfers the information to the adapter card 18 over the network 12. The keyboard and mouse information is received by the network interface controller 18 and passed to the processor 26. The processor converts this information into keyboard/mouse controller queue entries and places the entries into the Keyboard/Mouse Controller 46 of the computer system 14, where they are detected by the computer system 14 as if they had come from a locally attached keyboard and mouse. Because the graphics controller 22, processor 26, and network interface controller 24 are all co-located on the adapter card 18, communication among them over the local bus 28, 28a, 28b does not impact the performance of the I/O bus 20 of the host computer system 14. Moreover, because the graphics controller 22 serves as the installed graphics controller for the computer system 14, including its operating system, the system 10 of the present invention does not require any special software executing on the host computer system 14.

In the present embodiment, the processor 26 runs two main processes to perform the foregoing functionality, both of which are implemented in program code that the processor 26 executes. The program code is preferably stored in flash memory 38. The first of these processes comprises a Web server that enables a user to interact with the adapter card 18 from the client program for purposes of administration, configuration and control of the adapter card 18. These administrative, configuration and control function choices are presented to the user as HyperText Markup Language (HTML) pages that the Web server serves to the client program. The second process that the processor 26 runs is a VGA_remoter( ) process. This process is responsible for determining changes in the representation of the console screen (generated by the graphics controller 22 in response to commands from the computer system 14), packaging information representing those changes into TCP/IP segments, and sending the TCP/IP segments to the client program. The VGA_remoter( ) process is additionally responsible for receiving keystroke and mouse movement information from the remote client, converting that information into keyboard/mouse controller queue entries, and then placing those entries into the keyboard/mouse controller 46 of the computer system 14.

The step of determining changes in the representation of the console screen generated by the graphics controller 22 can be implemented in a variety of ways. For example, as mentioned above, in one embodiment, the graphics controller 22 is implemented using the CL-GD5465 graphics controller chip manufactured by Cirrus Logic, Inc. An advantageous feature of the CL-GD5465 graphics controller is that certain internal registers of the chip, including the standard VGA registers and some extended registers, are all accessible in memory as a linear list. Taking advantage of this feature, in this embodiment, the processor 26 first samples the state registers on the graphics controller 22 to determine the current VGA mode (i.e., text or graphics) of the graphics controller 22. Then, based on the VGA mode, text or graphics information (representing the console screen of the computer system 14) is copied from the video memory 42 of the graphics controller 22 to the local memory 40 of the processor 26. In the present embodiment, this transfer is controlled by the DMA controller 36. The processor 26 then compares the current text or graphic information with previously sampled information to determine any changes in the console screen representation. Specifically, in the present embodiment, the current frame is compared to a previous frame to identify changes in pixel values. Information concerning these changes is then packaged in TCP/IP segments and transmitted to the client program. In the present embodiment, the TCP/IP segments include a header followed by the body of the segment. For graphics mode, the header indicates which refresh line(s) are being sent in the body of the segment, and the body of the segment contains the new pixel values for those line(s). In text mode, the header indicates that the body of the segment contains text indices, and the actual indices are carried in the body of the segment. Other information that can be provided in the header includes, for example, indices into a particular text font (for text mode), or indices into a color pallet (text or graphics). As can be appreciated, the system of the present invention works equally well in both text and graphics modes.

Other graphics controllers do not provide the same capability to read the internal state registers as the Cirrus Logic CL-GD5465 controller provides. Indeed, with many graphics controllers, the state registers can only be read in conjunction with a write to the state registers. Thus, alternative approaches to determining changes in the console screen image may be required.

In one alternative embodiment in which it is not possible to read the state registers of the graphics controller 22 non-destructively, the processor 26 can be programmed to intercept the addresses, data, and commands that the host computer system 14 attempts to write to the graphics controller. The intercepted information can then be used to determine the state of the graphics controller. Once analyzed in this manner, the information is passed onto the graphics controller 22 as if it had come directly from the host. The processor 26 can then sample the information in the video memory 42 and compare it to a previous sample to determine the changes in the console screen image. Those changes can then be packaged and transmitted to the client program in the same manner as described above, so that the client can mimic the changes on the monitor at the remote workstation 16.

Figure 1A:
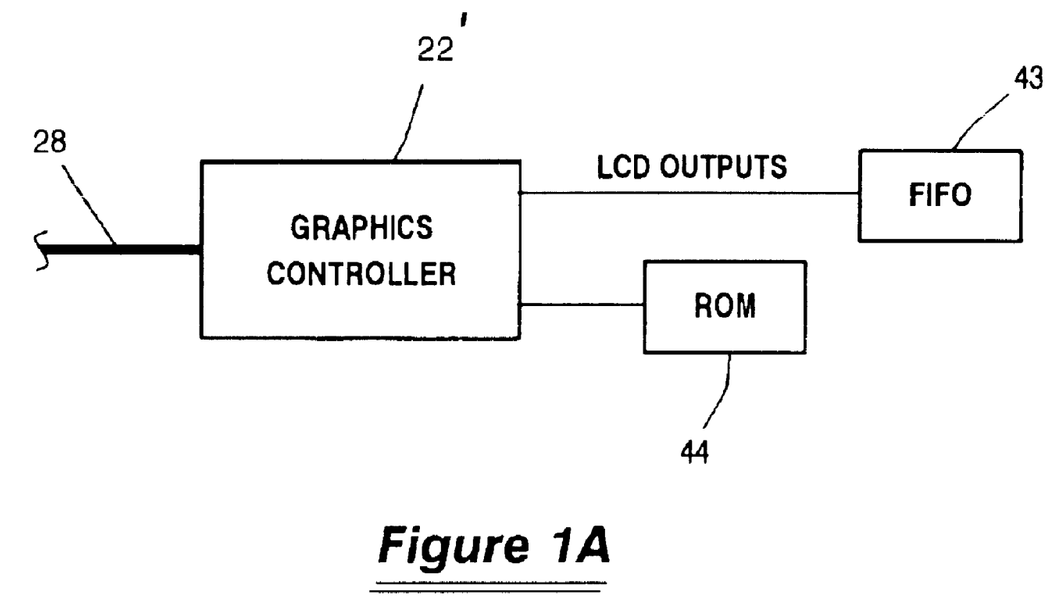
FIG. 1A shown an alternative embodiment of the system of FIG. 1.

FIG. 1A illustrates yet another alternative embodiment, in which the graphics controller 22' is implemented using a chip that is intended for use with Liquid Crystal Display (LCD) screens. In addition, a first-in, first-out (FIFO) buffer 43 is attached to the outputs that are normally connected to an LCD display screen. The data in the FIFO can then periodically be sampled to determine what data the graphics controller 22' is trying to write to its LCD outputs. This data would include the raw graphics data and certain screen placement information (depending on the type of LCD screen with which the chip is designed to work, certain signals are typically available that indicate, for example, where to gate each successive batch of pixel data). Thus, in this embodiment, the FIFO 43 takes the place of an LCD display. Although the VGA mode could not be determined from this information, most graphics controllers for LCD monitors allow the shape of the screen to be preset, and therefore, the processor 26 can monitor when the top of the screen is being refreshed. From the information captured in the FIFO 43, the processor 26 can determine what changes to the console screen have occurred between successive samples. The changes can then be packaged and transmitted to the client program in the same manner as described above, so that the client can mimic the changes on the monitor at the remote workstation 16.

Referring again to FIG. 1, it should be noted that depending on the capabilities and features of the graphics controller used to implement controller 22, in some embodiments, a single memory may be shared by both the processor 26 and the graphics controller 22, thus replacing the separate memories 40 and 42 shown in FIG. 1 with a single memory.

Disk Image Load Functionality

Still referring to FIG. 1, as mentioned above, according to an additional aspect of the present invention, the adapter card 18 further comprises a peripheral device interface 48 to provide support for the additional feature of remote control of disk image loads on the computer system 14, including partitioning, formatting, and loading software and/or data onto, a local storage medium (not shown) attached to the interface 48. In the present embodiment, the peripheral device interface comprises a Small Computer Systems Interface (SCSI) controller implemented, for example, using an Adaptec® AIC-7897 SCSI controller chip available from Adaptec, Inc. In accordance with this aspect of the present invention, the Basic Input/Output System (BIOS) of the computer system 14 will use a storage medium (e.g., disk unit) (not shown) attached to the SCSI controller 48 to boot. The operating system of the computer system 14 may continue to use the SCSI controller 48 for access to the storage medium or to other SCSI peripherals.

Using the client program, a user can request via the network connection to the adapter card 18 that the adapter card 18 enter a setup mode the next time the computer system 14 boots—this is accomplished by setting a control flag (i960_config_now) on the adapter card 18. When the i960_config_now flag is set, the next time the computer system 14 boots, the normal SCSI BIOS is replaced by a modified SCSI BIOS that stalls the host Central Processing Unit (CPU) 50 in SCSI BIOS setup. This guarantees the processor 26 on the adapter card 18 sole access to the SCSI controller 48. A user can observe and set the state of the SCSI controller 48, select the boot device for the computer system 14, and format and partition disk units attached to the SCSI controller 48. Additionally, files may be copied between the remote workstation 16 and disk units attached to the SCSI controller 48. A user chooses these operations via HTML pages served by the Web server on the adapter card, and the processor 26 performs these functions by executing corresponding procedures implemented in program code stored in the flash memory 38. Thus, in this manner, the peripheral device interface 48(e.g., a SCSI controller) may be selectively controlled by either the computer system 14 or the processor 26.

While in the present embodiment, the peripheral device interface 48 comprises a SCSI controller, in other embodiments, other interfaces can be implemented, as long as they support the attachment of storage media. Other possible interfaces include, without limitation, the Integrated Device Electronics (IDE) interface, the IEEE 1394 ("FireWire") interface, the Universal Serial Bus (USB) interface, and the Fibre Channel interface. The SCSI interface is presently preferred because of its speed, the length of cable that SCSI supports (over 40 ft.), and the wide availability of software drivers for a variety of operating systems (e.g., UnixWare, Windows NT, VxWorks, etc.) and device types (e.g., CDROM, DISK, etc.).

The Client Program

In the present embodiment, the client program comprises a browser that connects to the Web Server process executing on the adapter card 18 and serves as the administrative and control interface of the system 10, in combination with one or more software modules that implement the remote console functionality described above. In the present embodiment, any HyperText Transfer Protocol (HTTP) and HTML compliant browser can serve as the browser of the client program, including, for example, Microsoft® Internet Explorer or Netscape Navigator®. In the presently preferred embodiment, the remote console functionality (screen information interpretation and processing/keystroke and mouse movement gathering and transmission) is implemented as a browser add-in. In particular, in this embodiment, the remote console functionality is implemented as an ActiveX control. However, the functionality could alternatively be implemented, for example, as a plug-in for use with Netscape Navigator®, as a Java applet, or in some other form such as an executable program. Further description of the user interface implemented by the Web Server on the adapter card 18 and displayed by the browser of the client program is provided hereinafter.

While only a single, remote workstation is shown in FIG. 1, it is understood that multiple client programs, running on one or more different remote workstations, may connect to and interact with a single adapter card 18, allowing remote console emulation for a given computer system 14 to be performed from multiple locations on the network. Also, a given client program on a given remote workstation can be used to control any number of different adapter cards 18 in any number of different computer systems 14. Thus, a single remote workstation 16 can be used to remotely administer multiple different computer system 14. Each client program and adapter card 18 is assigned a unique Internet Protocol (IP) address, thus providing unique identities across the network 12.

While in the present embodiment, the client program comprises a Web browser in combination with one or more software modules (e.g., ActiveX control, plug-in, Java Applet, etc.) that implement the remote console functionality described above, in other embodiments, the client program can be implemented in the form of a stand-alone computer program or application that handles both the administration and configuration of the adapter card 18 as well as the remote console functionality.

System Operation

Figure 2:
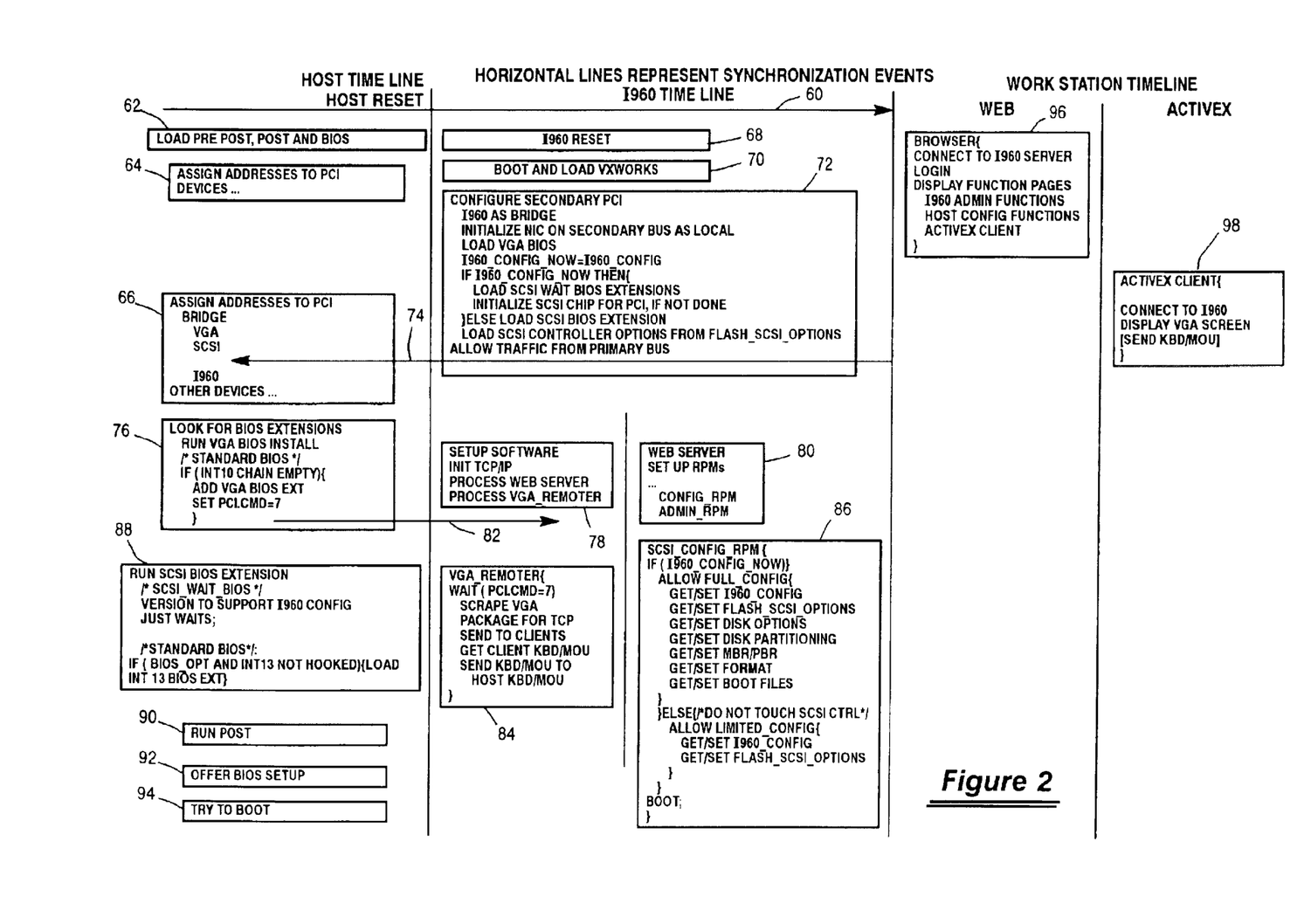
FIG. 2 is a flow diagram illustrating the operation of the system of FIG. 1.

FIG. 2 is a flow diagram illustrating further details concerning the operation of the system 10 of the present invention, including the adapter card 18 and the client program. The diagram of FIG. 2 provides a time line indicating when certain events on the adapter card 18 and within the client program occur in relation to each other and to events on the host computer system 14. Certain horizontal lines in FIG. 2, for example, lines 60, 74, and 82, represent synchronization events. In this example, the processor 26, bridges 32 and 34, and the DMA controller 36 are implemented using the i960® RP microprocessor described above.

As shown, operation of the system of the present invention begins with the booting of the computer system 14. Specifically, at step 62, the computer system 14 is either powered-on or reset, causing it to load its pre-POST (Power On Self-Test), POST, and BIOS code, typically from a read-only memory (ROM) (not shown). At step 64, the host computer 14 begins the process of assigning addresses to PCI devices connected to its I/O bus 20. As shown in greater detail in step 66, the computer system 14 first assigns an address to the PCI bridge 30, and behind that, to the graphics controller (VGA) 22 and to the peripheral device interface (SCSI) 48. That process is held up, however, until the synchronization event indicated by line 74 occurs on the adapter card 18, as discussed below.

Line 60 in FIG. 2 signifies the first synchronization event, and thus, as indicated, simultaneously with step 60 on the host computer 14, at step 68, the processor 26 (which in the present embodiment is an I960® RP processor) on the adapter card 18 receives a reset signal. This causes the processor 26 to load and boot its embedded operating system from flash memory 38, as shown at step 70.

At step 72, the processor 26 performs various configuration tasks. First, the processor 26 configures the local bus segment 28a (a secondary PCI bus), as well as the bridges 32 and 34. The network interface controller 24 is then initialized on the bus segment 28a as a LOCAL device (i.e., not visible to the host CPU 50). The graphics controller BIOS (which in this example is a VGA BIOS) is loaded next into the host memory 52 by the host BIOS. The processor 26 then examines the i960_config_now flag to determine whether the adapter card 18 is to take control of the peripheral device interface 48, which in this example is a SCSI controller, or whether it is to let the computer system 14 take control of the interface 48. As illustrated in psuedocode in step 72, if the i960_config_now flag is set, then the processor 26 loads a modified SCSI BIOS extension code from the flash memory 38 into a location in local memory 40 from which the host BIOS then loads that code into the host memory 52. As described hereinafter, the modified SCSI BIOS, referred to herein as SCSI WAIT BIOS extensions, stall the host Central Processing Unit (CPU) 50 in its SCSI BIOS setup (as described hereinafter in step 88). The processor 26 then takes control of the SCSI controller 48 and initializes it on the local bus 28.

If, on the other hand, the i960_config_now flag is determined in step 72 not to be set, the processor 26 loads the standard SCSI BIOS extensions from the flash memory 38 to the location in the local memory 40 from which the host BIOS then loads the extensions into its host memory 52. The standard SCSI BIOS extensions code does not stall the host computer system 14 in its SCSI BIOS setup, and the processor 26 does not take control, nor initialize the SCSI controller 48.

Once the appropriate SCSI BIOS extensions are loaded based on the i960_config_now flag, the processor 26 loads a set of SCSI controller options (Flash_SCSI_options) from flash memory 38, which in this embodiment is a flash memory. The Flash_SCSL_options determine the initial values of certain SCSI variables. Finally, in step 72, the processor 26 enables communication between its local bus segment 28b and the primary local bus segment 28 through bridge 32. As indicated by line 74, this is a synchronization event, because communication across bridge 32 is necessary for the host computer system 14 to be able to assign a PCI address to the processor 26, which it subsequently does as illustrated in step 66.

After assigning addresses to other PCI devices that may be connected to its I/O bus 20, the computer system 14 next looks for any VGA BIOS extensions (on its host I/O bus 20 and any subordinate buses, such as bus 28) and then runs its standard VGA BIOS install utility. Because the adapter card 18, and in particular the graphics controller 22 on the adapter card 18, is intended to serve as the primary graphics device of the computer system 14, the interrupt 10 (int10) chain of the computer system 14 will be empty. As a result, the computer system 14 will add the VGA BIOS extensions that were loaded by the adapter card in step 72 to the int10 chain, and these extensions will in turn set the PCI.CMD environment variable to a value of 7 (i.e., set PCI.CMD=7). As illustrated by line 82, this represents another synchronization event because, as described below, the VGA_remoter( ) process waits on the setting of the PCI.CMD variable before performing its functions.

In step 88, the host computer runs the SCSI BIOS extensions (either the standard SCSI BIOS extensions or the modified SCSI WAIT BIOS extensions) that were loaded by the processor 26 in step 72. If the SCSI WAIT BIOS extensions were loaded in step 72, in which case the adapter card 18 has taken control of the SCSI controller 48, those extension halt the host computer system in its BIOS setup routine. At this point, the adapter card 18, and thus a user at the client program, has sole access to devices connected to the SCSI controller 48 and can interact with them through the Web server interface described below. In particular, in accordance with this aspect of the present invention, the user can observe and set the state of the SCSI controller 48, select the boot device for the computer system 14, and format and partition disk units attached to the SCSI controller 48. Additionally, files may be copied between the remote workstation 16 and disk units attached to the SCSI controller 48.

If, on the other hand, the standard SCSI BIOS extensions were loaded in step 72 (meaning the i960_config_now flag is not set and the adapter card 18 does not take control of the SCSI controller), then the host computer system 14 runs these standard extensions and takes control of the SCSI controller 48. This will include the step of loading an interrupt 13 (int13) BIOS extension, if a BIOS_opt flag is set and int13 is not already hooked. The computer system then continues its normal boot process, including running its POST code (step 90), and offering the user an opportunity to enter the typical system BIOS setup (step 92). Finally, at step 94, the computer system 14 attempts to boot the operating system from the boot device attached to the SCSI controller 48.

Referring again to the steps performed on the adapter card 18, after performing the task listed in step 72, the processor 26 initiates execution of setup software stored as program code in the flash memory 38. In greater detail, the setup software first initializes code that implements the TCP/IP protocol to enable communications between the network interface controller 24 and the client program via the network 12. The processor 26 then starts both the Web server process and the VGA_remoter( ) process as separate threads.

As shown at step 84, the VGA_remoter( ) process waits on the PCI.CMD variable. Once this variable is set to the appropriate value (PCI.CMD=7) by the host computer system 14 in step 76, the VGA_remoter( ) process begins its remote console functions. Specifically, as listed in step 84, at predetermined intervals, the VGA_remoter( ) process determines changes in the console screen representation generated by the graphics controller 22 using one of the alternative methods described above (referred to in step 84 as "Scrape VGA"), packages the changes into TCP/IP segments, and then sends those segments to the client program via the network interface controller 24. Additionally, the VGA_remoter( ) process periodically receives keyboard and mouse movement and click information from the client program via TCP/IP segments, converts them to keyboard/mouse controller queue entries, and then transmits them to the keyboard/mouse controller 46 of the host computer 46 as if they had been generated locally.

The WEB Server process is illustrated at step 80. In the present embodiment, in which the processor 26 runs the VxWorks® real-time operating system (RTOS) from Wind River Systems, the Web server is also supplied by Wind River Systems. In this embodiment, the WEB server makes use of Request Processing Modules(RPM), a feature of the Wind River Systems Web server. A Request Processing Module (RPM) is a module of one or more procedures that can be registered with the Web Server to be called when specific HTTP or HTML protocols or data strings are sent to the Web Server. Thus, in this embodiment, RPMs are the mechanism by which the functions chosen by a user at the client program are initiated and performed by the processor 26 on the adapter card 18. As shown in step 80, the Web Server sets up two RPMs to handle the administrative functions (admin_RPM) and the configuration functions (config_RPM) that a user at the client program can selected as described above. Additionally, another RPM (SCSI_Config_RPM), shown separately as step 86, is registered with the Web Server to support the disk image load functionality of the adapter card 18. The procedures available to a user from the SCSI_Config_RPM depend upon whether the i960_config_now flag is set (i.e., whether the adapter card 18 or the computer system 14 has control of the SCSI controller 48). When the adapter card 18 has control (i960_config_now is set), the user is provided with a full set of configuration options. The procedures of the SCSI_Config_RPM to support these options include:

(i) get/set i960_config( )—procedures that allow a user to view or set the current state of the i960_config_now flag in order to enable/disable control of the SCSI controller 48 by the processor 26;

(ii) get/set Flash_SCSI_options( )—procedures that allow a user to view or set the Flash_SCSI_options for the SCSI controller 48;

(iii) get/set DISK options—procedures that allow the user to view or set certain options relating to the storage media (e.g., disk units) attached to the SCSI controller, including, for example, identification as a boot unit, speed of access, etc.;

(iv) get/set disk partitioning—procedures that allow the user to view or set the partitioning of a storage media attached to the SCSI controller;

(v) get/set MBR/PBR—procedures that allow the user to view or set the Master Boot Record or the Primary Boot Record of the storage medium from which the computer system 14 boots its operating system;

(vi) get/set format—procedures that allow the user to identify or change the current formatting of a storage medium attached to the SCSI controller 48; and (vii) get/set BOOT files—procedures that allow the user to view or replace (in case of damage) the current BOOT files (i.e., files associated with the initialization of a particular operating system) on the storage medium from which the computer system 14 boots.

If the adapter card 18 does not have control of the SCSI controller 48 (i960_config_now is not set), then the user is limited to only the procedures (i) and (ii) above.

As explained above, the client program or interface at the remote workstation 16 consists of a browser and, in the presently preferred embodiment, an ActiveX control. As shown at step 96, the browser 96 is used to connect to the i960 Web Server, to enable a user to Login to the Web Server, to display the HTML pages that provide the administrative and configuration function options, as well as to serve as the environment from which the ActiveX control is launched. The ActiveX control, as illustrated at step 98, handles receipt and interpretation of the screen information received from the adapter card 18, as well as gathering of keyboard and mouse information for transmission to the adapter card 18.

Figure 3:
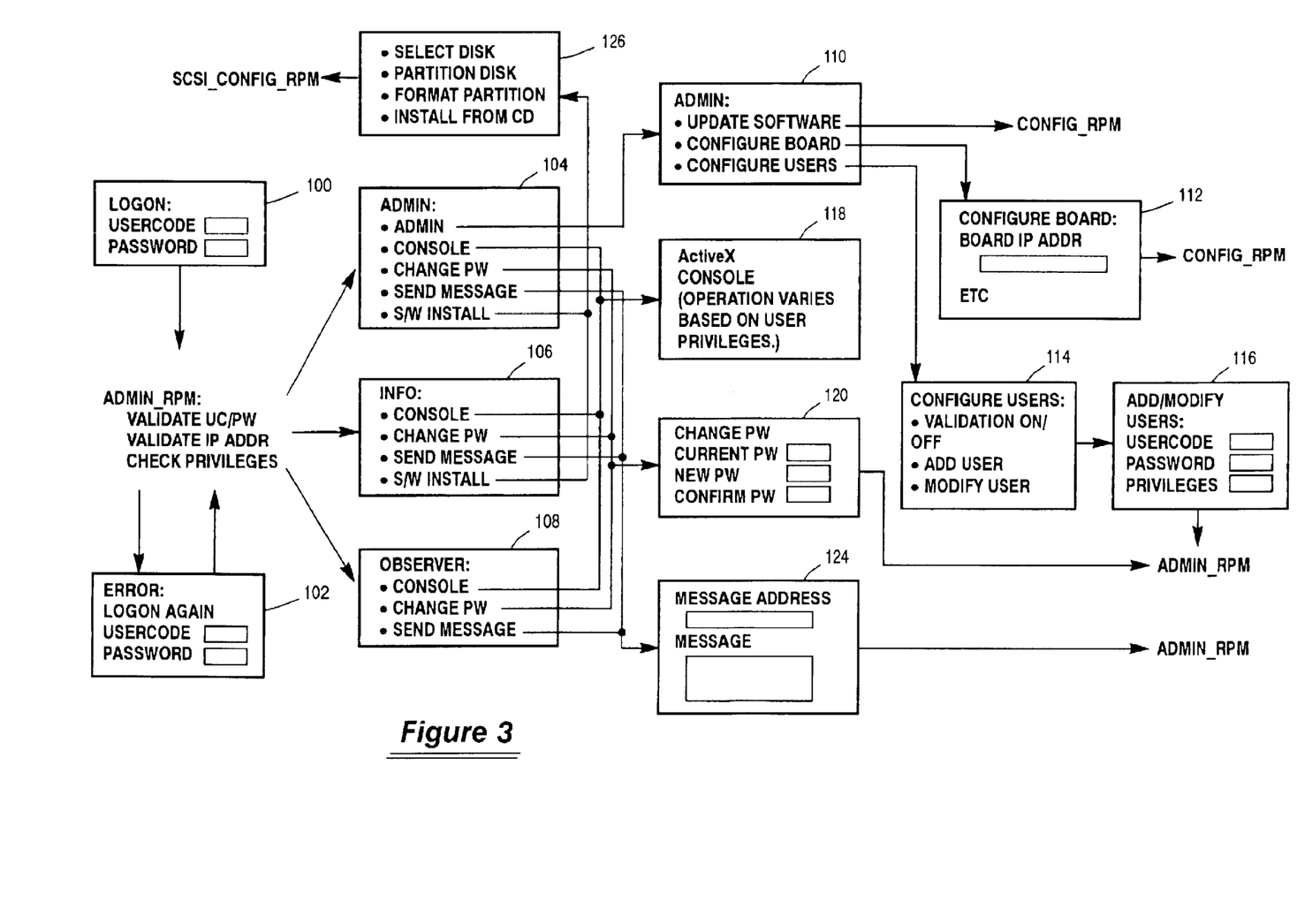
FIG. 3 illustrates a user interface of the system of FIG. 1, in accordance with one embodiment thereof.

FIG. 3 is a diagram illustrating one embodiment of a layout for the user interface implemented by the Web Server on the adapter card 18 and displayed by the browser of the client program. Each block in FIG. 3 represents a different HTML page that the Web Server presents to the browser. In the present embodiment, these HTML pages are stored in the flash memory 38. Block 100 represents the index page provided by the Web Server on the adapter card 18. This is the page shown when the browser first connects to the IP address of the adapter card. The index page 100 provides a form for the user to enter a usercode and password. After the usercode and password are entered, they are transmitted to the adapter card 18, where the processor 26 invokes procedures from the admin_RPM to validate the usercode/password combination and the IP address of the remote workstation 16. If the usercode/password combination is not validated, the user is presented with HTML page 102, which allows the user to reenter the data. If the validations are successful, the processor 26 determines what privileges the current user has. In the present embodiment, a user can have one of three levels of privilege: Administrator, Informational, or Observer. An Administrator-level user has access to all of the functionality of the adapter card. An Informational-level user is able to perform all operations, except those reserved to Administrators. An Observer-level user can only observe the console screen generated at the remote workstation 16 but does not have access to any configuration or administrative functions except for changing the user's password and sending messages to other client programs connected to the same adapter card 18. Based on the user's privilege level, one of three HTML pages 104, 106, or 108 is presented to the user by the Web Server. An Administrator-level user receives HTML page 104, an Informational-level user receives HTML page 106, and an Observer-level user receives HTML page 108.

Referring to the HTML page 104 for an Administrator-level user, the user at this level has the following options: Admin, Console, Change PassWord(PW), Send Message, and Software(S/W) Install. Selecting the Admin option brings up HTML page 110, which gives the user the following additional options: Update Software, Configure Board, and Configure Users. Selecting the Update Software option invokes a procedure in the config_RPM on the adapter card 18 that allows the user to transfer new software (i.e., program code) to the adapter card 18 in order to, for example, upgrade the software on the adapter card 18. The Configure Board option brings up an additional HTML page 112 that provides certain configuration options, such as, for example, the ability to set the IP address of the adapter card 18. As illustrated, that option would invoke a procedure in the config_RPM on the adapter card 18 which would store the new IP address in the appropriate location on the adapter card 18. The Configure Users option in HTML page 110 links to additional HTML pages 114 and 116 that provide options for turning user validation on and off, adding new usercode and password combinations, modifying existing usercode and password combinations, and changing the privilege level of a given user. Appropriate procedures in the admin_RPM will be invoked to carry out the requested changes or additions.

Referring again to the initial Administrator-level HTML page 104, the next choice is Console. Selecting this option launches the ActiveX control of the client program, which reproduces the console screen of the computer system 14 in a window or frame on the monitor of the remote workstation 16 based on the information received from the adapter card 18, and which gathers and transmits keystroke and mouse information to the adapter card 18. The functionality of the ActiveX control may vary depending upon the privilege level of the user. For example, an Observer-level user may be able to view the reproduced console screen, but the keystroke and mouse movement capabilities may be disabled, thus preventing the user from interacting with the computer system 14.

Still referring to the Administrator HTML page 104, the Change Password option links to an additional HTML page 120 that provides a form for changing the user's password. Again, a procedure in the admin_RPM on the adapter card 18 will be invoked to carryout the requested change.

In the present embodiment, a Send Message option is also provided. Because as mentioned above, more than one remote workstation can connect to a given adapter card 18, it is desirable to provide a simple message passing mechanism between the client programs at each separate location. This option allows a user at one remote workstation that is attached to an adapter card 18 to enter the network address of another remote workstation attached to the same adapter card 18 and to pass a brief text message to the other user. The message passing functionality is implemented as one or more procedures in the admin_RPM on the adapter card 18.

The last option available to an Administrator-level user is the Software (S/W) Install option which supports the operating system load functionality of the present invention. Selecting this option brings up another HTML page 126 with the choices available in accordance with this aspect of the present invention. Because the majority of the operating system load functionality of the present invention requires that the processor 26 have control of the peripheral device interface 48 (i.e., the SCSI controller in the preferred embodiment), upon selecting the S/W Install option, the set_i960_config( ) procedure of the SCSI_Config_RPM is invoked to set the i960_config_now flag, and the computer system 14 is then restarted. As described above, this will cause the computer system 14 to halt in its SCSI BIOS setup routine, allowing the processor 26 to take control of the SCSI Controller 48. Once this is completed, the options provided in HTML page 126 may be selected by the user.

The Select Disk option allows the user to select a storage medium (e.g., disk unit) attached to the SCSI controller 48. The Partition Disk option allows the user to partition the selected disk unit. The Format Partition option allows the user to format the selected disk unit. The Install From CD option allows the user to install software, including operating system software, from a CDROM device attached to the remote workstation 16 to the selected disk unit attached to the SCSI controller 48 on the adapter card 18. The functionality required to carry out each of these options is supported by the procedures of the SCSI_Config_RPM described above.

The options available to an Informational-level user are shown in the HTML page 106. As illustrated, an Informational-level user will be able to perform the Console, Change Password, Send Message, and S/W Install operations described above. However, an Informational-level user will not be able to perform the Admin operations that are available to an Administrator-level user.

The options available to an Information-level user are shown in the HTML page 108. As illustrated, an Observer-level user will only be able to perform the Console, Change Password, and Send Message operations described above. An Observer-level user will not be able to perform the Admin or Software Install operations.

As the foregoing illustrates, the present invention is directed to a system, including an adapter card, for providing, via a network, remote control or emulation of a console of a first computer system, such as a mainframe or enterprise server, from a second, remotely located computer system or workstation on the network. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

Intel and i960 are registered trademarks of Intel Corporation. VxWorks is a registered trademark of Wind River Systems. Unixware is a registered trademark of The Santa Cruz Operation, Inc. Microsoft, Windows, Windows NT and/or other Microsoft products referenced herein are either trademarks or registered trademarks of Microsoft Corporation. Navigator is a registered trademark of Netscape Communications Corporation. Java is a trademark of Sun Microsystems, Inc.

What is claimed is:

1. An adapter card (18) for providing, via network (12), emulation of a console of a first computer system (14) at a second, remotely located computer system (16) on the network, the adapter card comprising:

a local bus (28) that interfaces to an input/output bus (20) of the first computer system when the adapter card is connected to the first computer system;

a graphics controller (22) coupled to said local bus that interacts with the first computer system to generate a representation of a console screen of the first computer system;

a network interface controller (24) coupled to said local bus and providing a connection to the network; and a processor (26) coupled to said local bus that determines changes in the representation of the console screen of the first computer system and that transmits information about the changes to the remotely located computer system via said network interface controller and a first-in, first-out (FIFO) buffer (43) coupled to an output of said graphics controller for capturing data representing the console screen of said first computer system, and wherein said processor determines changes in the representation of the console screen by processing the data in said FIFO buffer.

2. The adapter card recited in claim 1, wherein said FIFO is contained in a memory (42) interfaced to said graphics controller in which the graphics controller stores data representing the console screen of the first computer system, and wherein said processor determines changes in the representation of the console screen by processing the data in said memory.

3. The adapter card recited in claim 2, further comprising a second memory (40) interfaced to said local bus, and wherein the data representing the console screen of the first computer system that is stored in said memory interfaced to said graphics controller is periodically transferred to said second memory for processing by said processor to determine the changes in the representation of the console screen of the flirt computer system.

4. The adapter card recited in claim 3, further comprising a memory controller (36) coupled to said local bus that controls the transfer of the data representing the console screen of the first computer system from said memory interfaced to said graphics controller to said second memory.

5. The adapter card recited in claim 1, wherein said network interface controller is indirectly coupled to said local bus by a bridge (32, 34), such that communication between said processor and said network interface controller occurs across a separate bus segment (28a, 28b), isolated from said local bus (28).

6. The adapter card recited in claim 1, wherein said network interface controller implements an Ethernet protocol.

7. The adapter card recited in claim 1, wherein the information about the changes in the representation of the console screen of the first computer is transmitted to the remote computer system using a TCP/IP protocol.

8. The adapter card recited in claim 1, further comprising a peripheral device interface (48) coupled to said local bus that can be controlled selectively by one of the first computer system and said processor, wherein when the peripheral device interface is controlled by said processor, a device connected to said peripheral device interface can be controlled by a user using client software on the remote computer system via said network interface controller and said processor.

9. The adapter card recited in claim 8, wherein when said processor is selected to control said peripheral device interface, said processor causes a modified BIOS for the peripheral device interface to be loaded by the first computer system that halts the first computer system in order to allow said processor to take control of said peripheral device interface.

10. The adapter card recited in claim 9, wherein said processor is selected to control said peripheral dice interface by setting a flag variable stored on said adapter card, said processor examining said flag variable to determine whether to cause said modified BIOS to be loaded by the first computer system.

11. The adapter card recited in claim 8, wherein the device attached to said peripheral device interface comprises a store medium, and wherein control of the storage medium by the remote computer system can be accomplished via client software on said remote computer system, said adapter card thus enabled responsively to messages received at said adapter card from said client software to provide control over said first computer system exercising at least one of the following functions:

partitioning the storage medium;

formatting the storage medium; and installing software to the storage medium.

12. The adapter card recited in claim 8, wherein said peripheral device interface comprises a Small Computer Systems Interface (SCSI) controller.

13. The adapter card recited in claim 1, wherein said local bus comprises a Peripheral Component Interconnect (PCI) bus.

14. The adapter card recited in claim 1, wherein said processor functions, in part, as a Web server (80) that serves HTML pages to the remote computer system to enable a user at the remote computer system to configure adapter card.

15. A system for providing, via a network (12), emulation of a console of a first Computer system (14) on a second remotely located computer system (16) on the network said system comprising:

an adapter card (18) comprising:

a local bus (28) that interfaces to an input/output bus (20) of the first computer system when the adapter card is connected to the first computer system a graphics controller (22) coupled to said local bus that interacts with the first computer system to generate a representation of a console screen of the first computer system;

a network interface controller (24) coupled to said local bus and providing a connection to the network;

a processor (26) coupled to said local bus that determines changes in the representation of the console screen of the first computer system and that transmits information about the changes to the remotely located computer system via said network interface controller;

a client program (96, 98) executing on the remote computer system (16) that receives the information transmitted from the adapter card and reproduces therefrom the representation of the console screen of the first computer screen on a display device of the remote computer system; and a first-in, first-out (FIFO) buffer (43) coupled to an output of said graphics controller for capturing data representing the console screen of said first computer system, and wherein said processor determines changes in the representation of the console screen by processing the data in said FIFO buffer.

16. The system recited in claim 15, further comprising a memory (42) interface to said graphics controller in which the graphics controller stores data representing the console screen of the first computer system, and wherein said processor determines changes in the representation of the console screen by processing the data in said memory.

17. The system recited in claim 16, further comprising a second memory (40) interface to said local bus and wherein the data representing the console screen of the first computer system that is stored in said memory interfaced to said graphics controller is periodically transferred to said second memory for processing by said processor to determine the changes in the representation of the console screen of the first computer system.

18. The system recited in claim 17, further comprising a memory controller (36) coupled to said local bus that controls the transfer of the data representing the console screen of the first computer system from said memory interfaced to said graphics controller to said second memory.

19. The system recited in claim 15, wherein said network interface controller is indirectly coupled to said local bus by a bridge (32, 34), such that communication between said processor and said network interface controller occurs across a separate bus segment (28a, 28b), isolated from said local bus.

20. The system recited in claim 15, wherein said network interface controller implements an Ethernet protocol.

21. The system recited in claim 15, wherein the information about the changes in the representation of the console screen of the first computer is transmitted to the remote computer system using a TCP/IP protocol.

22. The system recited in claim 15, further comprising a peripheral device interface (48) coupled to said local bus that can be controlled selectively by one of the first computer system and said processor, wherein when the peripheral device interface is controlled by said processor, a device connected to said peripheral device interface can be controlled by a user using client software on the remote computer system via said network interface controller and said processor.

23. The system recited in claim 22, wherein when said processor is selected to control said peripheral device interface, said processor causes a modified BIOS for the peripheral device interface to be loaded by the first computer system that halts the first computer system in order to allow said processor to take control of said peripheral device interface.

24. The system recited in claim 23, wherein said processor is selected to control said peripheral device interface by setting a flag variable stored on said adapter card, said processor examining said flag variable to determine whether to cause said modified BIOS to be loaded by the first computer system.

25. The system recited in claim 22, wherein the device attached to said peripheral device interface comprises a store medium, and wherein control of the storage medium by the remote computer system can be accomplished via client software on said remote computer system, said adapter card thus enabled responsively to messages received at said adapter card from said client software to provide control over said first computer system exercising at least one of the following functions:

partitioning the storage medium;

formatting the storage medium; and installing software to the storage medium.

26. The system recited in claim 22, wherein said peripheral device interface comprises a Small Computer Systems Interface (SCSI) controller.

27. The system recited in claim 15, wherein said local bus comprises a Peripheral Component Interconnect (PCI) bus.

28. The system recited in claim 15, wherein said processor functions, in part, as a Web server (80) that serves HTML pages to the remote computer system to enable a user at the remote computer system to configure the adapter card.

29. The system recited in claim 28, wherein said client program comprises a Web browser (96) that displays HTML pages served to the remote computer system by said processor.

30. The system recited in claim 29, wherein said client program further comprises a browser add-in (98) that receives the information transmitted from the adapter card and reproduces therefrom the representation of the console screen of the first computer screen on the display device of the remote computer system.

31. The system of claim 15, wherein said system permits a plurality of instances of said client program to function in identical manner, each said instance having a unique identifier recognizable by said computer system.

* * * * *